Patented June 28, 1938

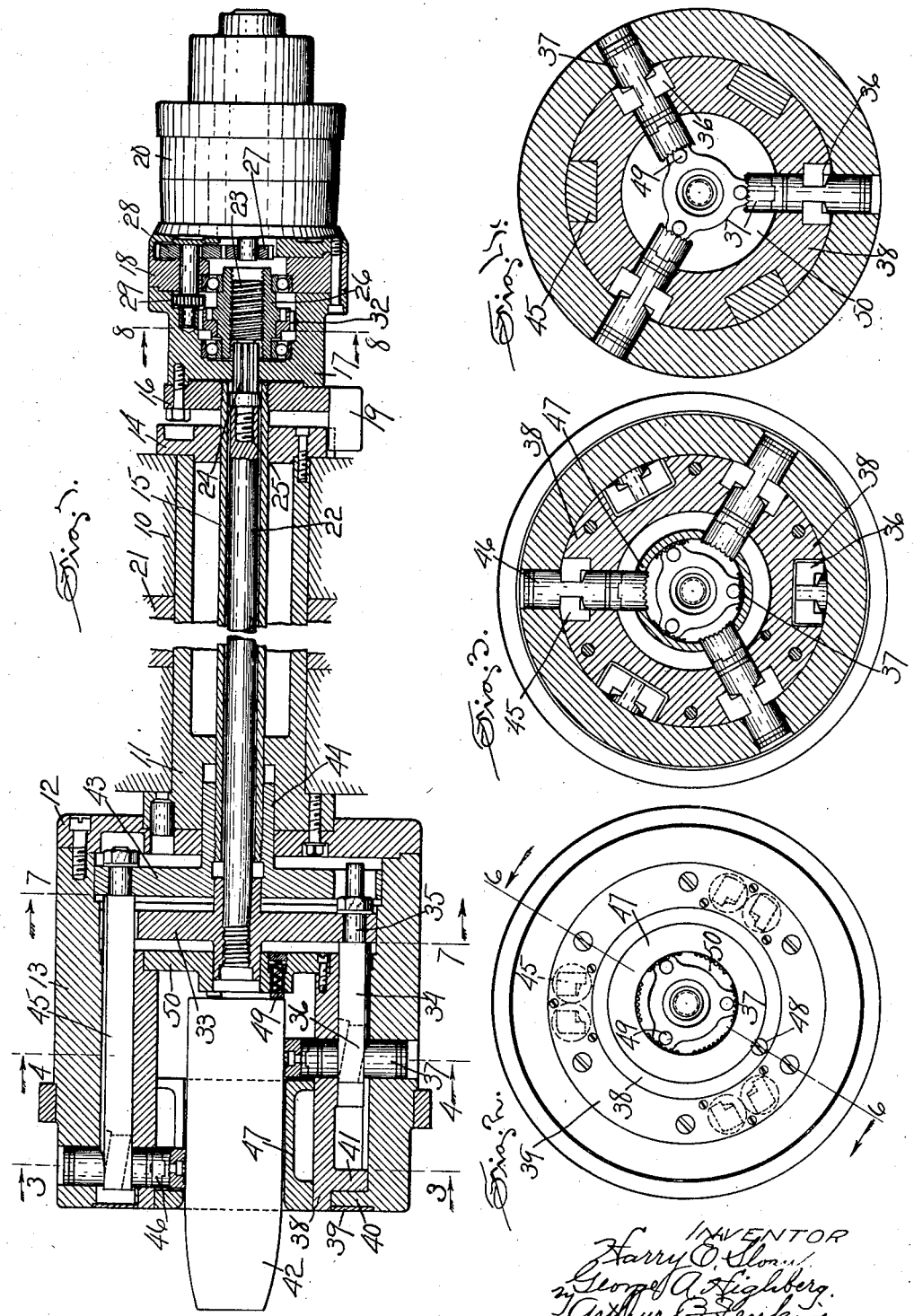

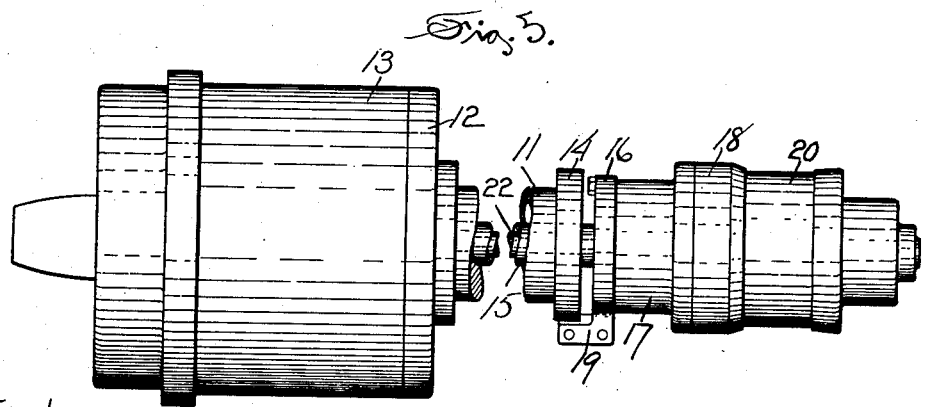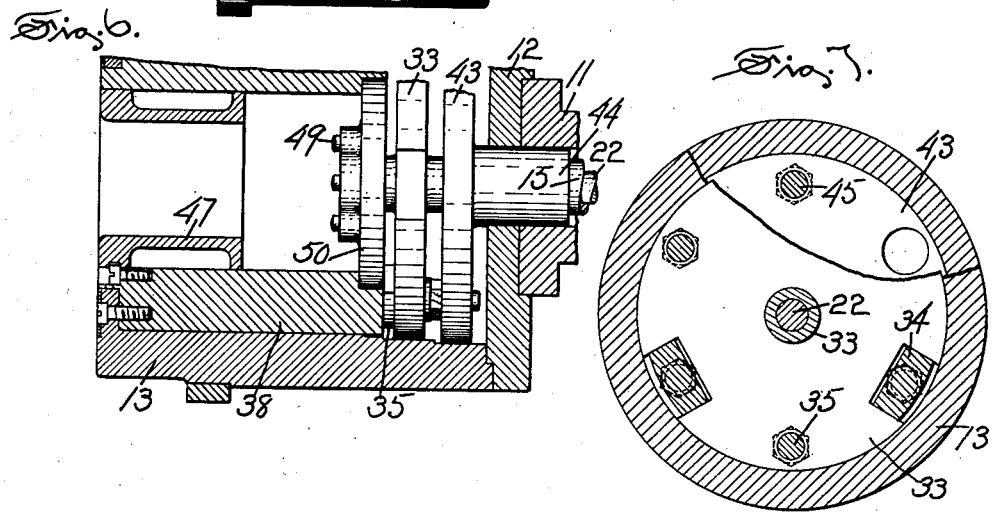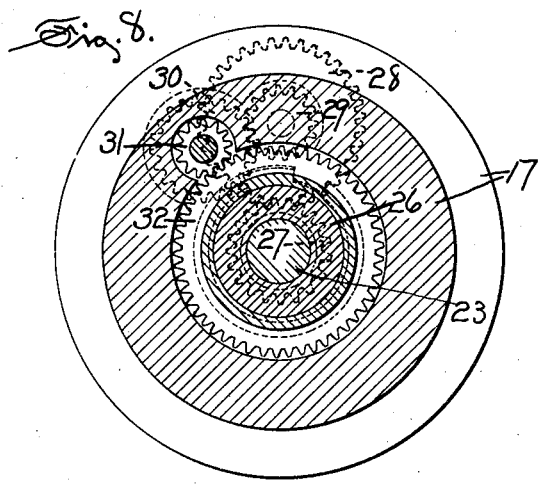

2,122,360

UNITED STATES PATENT OFFICE 2,122,360

CHUCK

Harry E. Sloan, Hartford, and George A. Highberg, West Hartford, Conn., assignors to The Cushman Chuck Company, Hartford, Conn., a corporation of Connecticut Application August 24, 1936, Serial No. 97,496

9 Claims. (Cl. 279—121)

This invention relates to the class of devices which are employed for holding articles while operations are being performed thereon, and an object of the invention, among others, is the production of a chuck which shall be particularly sensitive as to the force applied in the gripping action and in which such force shall be evenly distributed; and a further object of the invention is to provide a chuck which shall be particularly efficient in action.

One form of a chuck embodying the invention and in the construction and use of which the objects herein set out, as well as others, may be attained is illustrated in the accompanying drawings in which Figure 1 is a view in lengthwise section through the chuck on a plane passing through the axis thereof.

Figure 2 is an end view.

Figure 3 is a view in section on a plane denoted by the dotted line 3—3 of Fig. 1.

Figure 4 is a similar view on a plane denoted by the dotted line 4—4 of Fig. 1.

Figure 5 is a view in side elevation and on reduced scale with the lengthwise central portion broken out.

Figure 6 is a view in lengthwise axial section, on enlarged scale, through a portion of the chuck body and on a plane denoted by the dotted line 6—6 of Fig. 2.

Figure 7 is a view in cross section on a plane denoted by the dotted line 7—7 of Fig. 1.

Figure 8 is a view in cross section on a plane denoted by the dotted line 8—8 of Fig. 1, on enlarged scale.

In the accompanying drawings the numeral 10 denotes a bearing constituting a part of a machine in which the chuck is mounted and 11 denotes a chuck spindle to one end of which the chuck is secured, as by means of a cap 12, which is fastened in any suitable manner to the chuck body 13, pins and screws being shown for securing the cap to the spindle and screws for fastening the cap to the body, as shown in Figure 1 of the drawings. A plate 14 is secured, as by means of screws, to the rear end of the spindle 11 and a sleeve 15 is supported at its opposite ends in the spindle and in said plate, as shown in Fig. 1 of the drawings. A base plate 16 for a housing 17 is secured to the projecting end of the sleeve 15, as by means of a threaded end of the sleeve engaging a threaded hole in said base plate, and the latter is secured to the housing as by means of screws or other suitable fastenings. A motor base 18 is secured to and closes the end of the housing, screws being shown herein as suitable means for this purpose. The plate 16 has a key 19 in the form of a spline which engages in a groove in the plate 14, as shown in Fig. 1 of the drawings. A motor 20 of any desired type is secured to the base 18, and from the foregoing description it will be seen that the motor and the chuck are rigidly connected. In the construction herein shown the spindle is rotatably mounted and may be driven in any suitable manner as by means of a pulley 21, although in some instances it may be desired to have the spindle stationary.

A chuck jaw operating rod 22 extends through the sleeve 15 and is adapted for lengthwise reciprocating movement therein, the rear end of the rod having an actuator secured thereto, this actuator comprising a threaded actuating head 23 with a corrugated shank 24 and a threaded stem 25. The threaded stem fits a threaded hole in the end of the rod 22 and the corrugated shank fits a corrugated hole in the bottom of the housing 17, a collar being secured to the shank between a shoulder on the shank and the end of said rod.

The thread on the head 23 is engaged with the threaded surface of a hole in a chuck jaw actuating sleeve 26 rotatably mounted, as upon ball bearings, in the chamber in the housing 17 and in the motor base 18. Said sleeve is driven from the spindle of the motor by a train of gears of any suitable arrangement, as shown herein these comprising a pinion 27 on said spindle meshing with a gear 28 on an arbor mounted in the motor base and having a pinion 29 meshing with a gear 30 rigidly secured to a pinion 31 that meshes with a gear 32 secured to the sleeve 26 and as shown in Figs. 1 and 8 of the drawings.

From this construction it will be noted that rotation of the sleeve 26 will impart longitudinal movement to the chuck jaw operating rod 22 for actuating chuck jaws in a manner now to be described.

The rod 22 has secured at its front end a primary chuck jaw actuating disk 33 reciprocatingly mounted in the chuck body 13 and having a set of chuck jaw clamping bars 34 (three in number being shown herein) secured thereto, each bar comprising a shank 35 which is secured to the disk and a forked end 36 engaging in cam grooves in opposite sides of chuck jaws 37 slidably mounted for radial movement in the chuck body 13 and in a filler 38 secured within the chuck body and fitting the hole therein, this filler being secured to the chuck body as by means of screws passed through a cover ring 39 fitted in a shallow recess in the end of the body, said screws passing through a lip 40 in the mouth of the opening into the chamber in the body and through a flange 41 on the periphery of the filler 38 and as shown in Fig. 1 of the drawings.

The cams on the forked ends 36 of the bars 34 are cooperatively so shaped that when the rod 22 is drawn backwardly the jaws will be moved radially inwardly to clamp an article, as a shell 42, the latter having particularly thin walls and therefore requiring that the pressure of the jaws will not be such as to deform the walls of the shell.

A complemental chuck jaw actuating disk 43 is mounted for reciprocating movement in the chuck body between the disk 33 and the cap 12, said disk having a hub 44 which is screw threadedly engaged with the forward end of the sleeve 15, as shown in Fig. 1 of the drawings. The disk 43 has a set of jaw actuating bars 45 secured thereto and projecting therefrom, these bars being similar in construction to that already described with respect to the bars 34 except that they are longer and have their forked ends of cam shape to engage cam shaped grooves in chuck jaws 46 mounted for radial movement in the chuck body 13 and the filler 38. The cooperating cam shaped ends of the bars engaged in the cam shaped grooves in the jaws are such that when relative movement takes place between the actuating disk 43 and the chuck body 13 the chuck jaws 46 will be forced radially inward to clamp against the outer surface of the shell 42 at a distance from that engaged by the jaws 37. A bushing 47 is located within the filler 28 said bushing being slotted to receive the chuck jaws 46, the bushing being held in place as by a screw 48 threaded into the filler 38 and having a portion of its periphery engaging with a threaded recess in the side of the bushing and as shown in dotted lines in Fig. 2 of the drawings. The shanks 35 of the clamping bars 34 pass into enlarged openings in the disk 43 to enable relative movement to take place as between the disks 33 and 43.

In the operation of the device an article, as a shell 42, being placed within the opening in the bushing 47 and seated as against spring actuated plungers 49 in the hub of a plate 50 secured to the inner end of the filler 38, as shown in Fig. 1 of the drawings, the motor may be started in any well known manner and its operation through the connection of the train of gears will impart rotation to the chuck jaw actuating sleeve 26, thereby drawing the rod 22 and with it the primary actuating disk 33 to the right as seen in Fig. 1 and moving the chuck jaws 37 inwardly against the shell 42. When the jaws are pressed against the shell 42 and resistance is thereby offered to further inward movement, continued rotation of the actuating sleeve 26 will cause the motor, the housing 17, and the base plate 16 to be moved toward the left, thereby moving the sleeve 15 and actuating disk 43 in the same direction. This moves the jaw operating bars 45 to the left and the cooperating cam surfaces thereon acting upon the cam surfaces on the jaws 46 move the latter radially inward until they engage with the outer surface of the shell 42. The strength of the motor will be such that when a predetermined pressure is exerted the motor will be stalled, and this will prevent undue force against the shell 42 such as would injure it by distorting its walls.

The specification sets out a rod as a specific means for operating the actuating disks bearing the chuck jaw operating bars, reciprocating movement being imparted to said rod as by means of a screw and a screw threaded sleeve, but it will be obvious that other means for operating the disks and particularly for imparting lengthwise reciprocating movement to the rod may be employed, and we do not limit our invention to the specific means disclosed herein.

We claim:

1. A chuck including a hollow body closed at one end, a rotatably mounted spindle secured to the end of said body and having a recess, a jaw operating plate located in said body and having a hub projecting into said recess, a second jaw operating plate also located in said body and having a hub projecting into a recess in the first mentioned plate, a set of jaw actuating bars extending from each of said plates, a set of jaws mounted in said body and operatively connected with each of said sets of bars, and means actuated by resistance to one of said sets of jaws for moving the actuating member of the other set of jaws into clamping action.

2. A chuck including a hollow cylindrical body, a plate removably secured to one end of the body to close the chamber therein, a rotatably mounted spindle secured at its end to said plate and having a recess therein, a jaw operating plate located in said body and having a hub projecting into said recess, a second jaw operating plate also located in said body and having a hub projecting into the recess in a jaw operating plate, a set of jaw actuating bars secured to the second mentioned plate and projecting lengthwise within said body, a set of jaw actuating bars secured to the first mentioned plate and projecting through openings in the second mentioned plate and along said body, a set of jaws mounted in said body and operatively connected with each of said sets of bars, and means actuated by resistance to one of said sets of jaws for moving the actuating member of the other set of jaws into clamping action.

3. A chuck including a hollow body closed at one end, a rotatably mounted spindle secured to the end of said body, a jaw operating plate located in said body, a second jaw operating plate concentrically mounted with respect to the first mentioned plate within said body, a filler located in said body and formed to provide spaces between said body and filler, a set of jaw actuating bars secured to each of said plates and projecting along said spaces, jaws operatively connected with each set of bars and mounted in said filler and body, and means actuated by resistance to one of said sets of jaws for moving the actuating member of the other set of jaws into clamping action.

4. A chuck including a hollow body closed at one end, a rotatably mounted spindle secured to the end of said body, a jaw operating plate secured in said body, a second jaw operating plate concentrically mounted with respect to the first mentioned plate within said body, a filler of cylindrical form located in said body and formed to provide spaces between said body and filler, a plate closing the end of said filler and having an opening for a hub projecting from one of said plates, a set of jaw actuating bars projecting from each of said plates along said spaces, jaws mounted in said body and filler and operatively connected with said bars, and means actuated by resistance to one of said sets of jaws for moving the actuating member of the other set of 5. A chuck including a hollow body closed at one end, a rotatably mounted spindle secured to the end of said body and having a recess, a jaw operating plate located in said body and having a hub projecting into said recess, a second jaw operating plate mounted in said body and having a hub projecting into a recess in the first mentioned plate and also having a hub projecting from its opposite side, a filler located in said body and formed to provide spaces between said body and filler and having an end with a hole to receive a hub projecting from said last mentioned plate, a set of jaw actuating bars projecting from each of said plates along said spaces, chuck jaws mounted in said body and filler and operatively connected with said bars, and means actuated by resistance to one of said sets of jaws for moving the actuating member of the other set of jaws into clamping action.

6. A chuck including a hollow body closed at one end, a rotatably mounted spindle secured to the end of said body and having a recess, a filler mounted within said body and formed to provide spaces between said body and filler, a chuck jaw actuating plate underlying said filler, a second chuck jaw actuating plate underlying the first mentioned plate, two sets of chuck jaws mounted at different distances from the outer end of said body and having sliding action in said body and filler, chuck jaw operating bars projecting from each of said plates along said spaces into operative engagement with each of said sets of jaws, a sleeve secured to one of said plates and an actuating rod secured to the other of said plates, and means connected with said sleeve and bars and actuated by resistance to one of said sets of jaws for moving the actuating member of the other set of jaws into clamping action.

7. A chuck including a chuck body closed at one end, a rotatably mounted spindle secured to the closed end of said body, a filler formed to provide spaces between said body and filler, said filler being secured to said body, a jaw actuating plate underlying the end of said filler within said body, a second jaw actuating plate underlying the first mentioned plate within said body, said plates being mutually supported one by another, a set of jaw actuating bars projecting from each of said plates along the space between said filler and body, chuck jaws slidably mounted in said body and filler and operatively connected with said bars, a bushing located within said filler and having slots to receive said chuck jaws, an actuating sleeve secured to one of said plates and an actuating rod secured to the other of said plates, and means connected with said sleeve and rod and actuated by resistance to one of said sets of jaws for moving the actuating member of the other set of jaws into clamping action.

8. A chuck including a hollow body closed at one end, a rotatably mounted spindle secured to the end of said body, an adapted plate secured to the end of said spindle, an actuating sleeve projecting through said adapter plate, an actuating rod projecting through said sleeve, a base plate secured to the end of said sleeve, a motor secured to said base plate, a key projecting from said base plate into a slot in said adapter plate, a chuck body secured to the end of said spindle, and sets of chuck jaws operatively mounted within said body and operatively connected with said rod and sleeve for operation thereby.

9. A chuck including a hollow body closed at one end, a rotatably mounted spindle secured to the end of said body, jaw operating plates located in said body, a filler located in said body and formed to provide spaces between said body and filler, sets of jaw actuating bars secured to said plates and projecting along said spaces, jaws operatively connected with each of said bars and mounted in said filler and body, and means actuated by resistance to one of said sets of jaws for moving the actuating member of another set of jaws into clamping action.

HARRY E. SLOAN.
GEORGE A. HIGHBERG.